Figure 1:
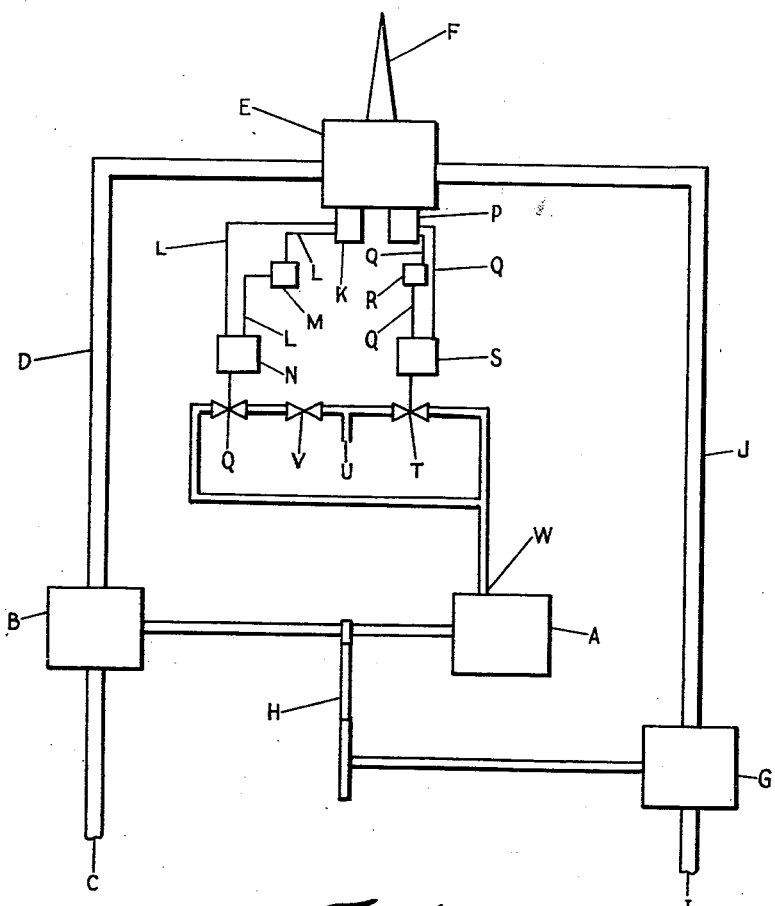

Aug. 14, 1962 H. EDWARDS ET AL 3,049,267
MULTIPLE-FEED SPRAY GUNS
Filed Aug. 31, 1959 3 Sheets-Sheet 1

INVENTORS
HARRY EDWARDS
JOHN ALEXANDER PARTRIDGE
BY Cushman, Darby & Cushman
ATTORNEYS Aug. 14, 1962   H. EDWARDS ET AL   3,049,267
MULTIPLE-FEED SPRAY GUNS
Filed Aug. 31, 1959   3 Sheets-Sheet 2

INVENTORS
HARRY EDWARDS
JOHN ALEXANDER PARTRIDGE

BY Cushman, Darby & Cushman
ATTORNEYS

United States Patent Office 3,049,267
Patented Aug. 14, 1962

3,049,267
MULTIPLE-FEED SPRAY GUNS
Harry Edwards and John Alexander Partridge, Manchester, England, assignors to Imperial Chemical Industries Limited, London, England, a corporation of Great Britain
Filed Aug. 31, 1959, Ser. No. 837,243
Claims priority, application Great Britain Sept. 2, 1958
2 Claims. (Cl. 222—134)

This invention relates to multiple-feed spray guns and the like and more particularly to means for the control thereof.

In specification No. 759,602 there is described a metering apparatus for supplying liquids in a predetermined proportion, the apparatus comprising a metering pump for each of the said liquids, the said pumps being coupled together through drives of predeterminable ratio and driving means for the said pumps the speed of which is controllable by the pressure in the output line of one of the said pumps. The metering apparatus so-described is especially valuable for supplying a plurality of ingredients to a spray gun. When, however, it is essential to maintain an accurate relation between the proportions of the various ingredients and especially when the feed lines to the spray gun are relatively long, flexible pipes, control of the driving means according to the pressure in said pipes is not wholly satisfactory. Owing to the possibility of differential distension of the feed pipes associated with pressure surges in the feed lines when spraying stops, it is found that appreciable variations in the proportions of ingredients occur at the beginning of each spraying operation. In the case of spraying polyurethane-forming ingredients, especially polyurethane foam ingredients, such variations in proportions can result in unsatisfactory products.

We have now found that this disadvantage can be avoided and other advantages can be achieved by the use in the metering apparatus of specification No. 759,602 of an electrical remote control of the metering pumps in place of the pneumatic control therein described.

Thus according to the invention we provide a metering apparatus for supplying liquids in a predetermined proportion, the apparatus comprising a metering pump for each of the said liquids, the said pumps being coupled together through drives of predeterminable ratio and driving means for the said pumps the speed of which is controllable electrically from at least one switch mounted on the spray gun or the like to which the liquids are supplied.

As in the case of specification No. 759,602, the pumps may be coupled together by constant ratio drives such as chain drive or gearing or by variable ratio drives. Similarly, the driving means for the pumps may be effected by air or electricity or any other convenient method.

Control of the driving means for the pumps is achieved in the present invention by remote electrical switchgear fitted to the spray gun itself. The switchgear conveniently comprises at least one small switch mounted on the spray gun so as to be operated when the trigger operating the spray gun is actuated. The switch is connected electrically in series with a source of electrical energy, conveniently at a low voltage of for example 12 volts, and directly or through a relay with the control of the driving means. When said driving means is compressed air, the control is conveniently a solenoid operated air valve. If desired, the switchgear on the spray gun may comprise a plurality of small switches each operating a control of the driving means and each actuated successively as the spray gun trigger is further depressed. In this manner a step-wise control of the driving means may be achieved so that a more or less continuously variable speed of the pumps may be obtained according to the amount by which the spray gun trigger is depressed.

Figure 2:
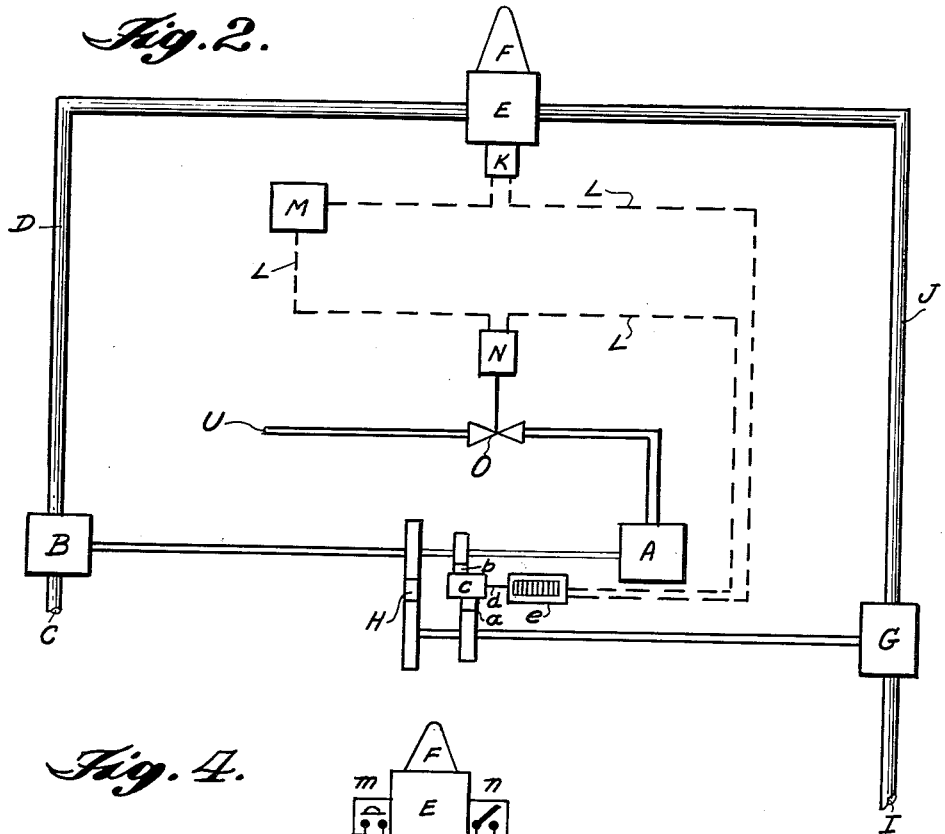
Figure 4:
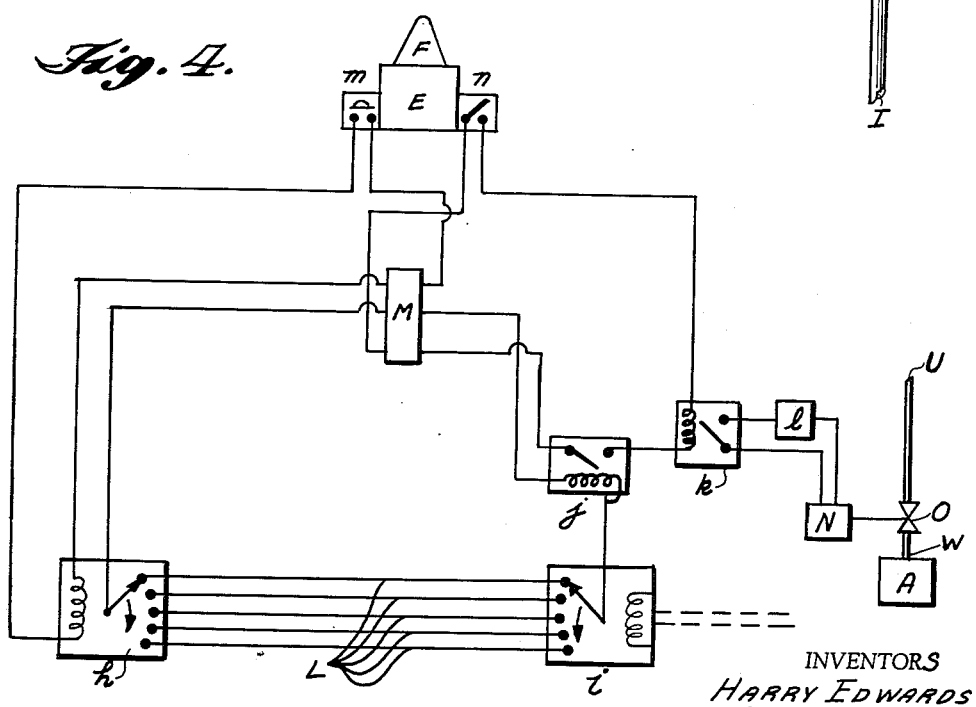
Figure 3:
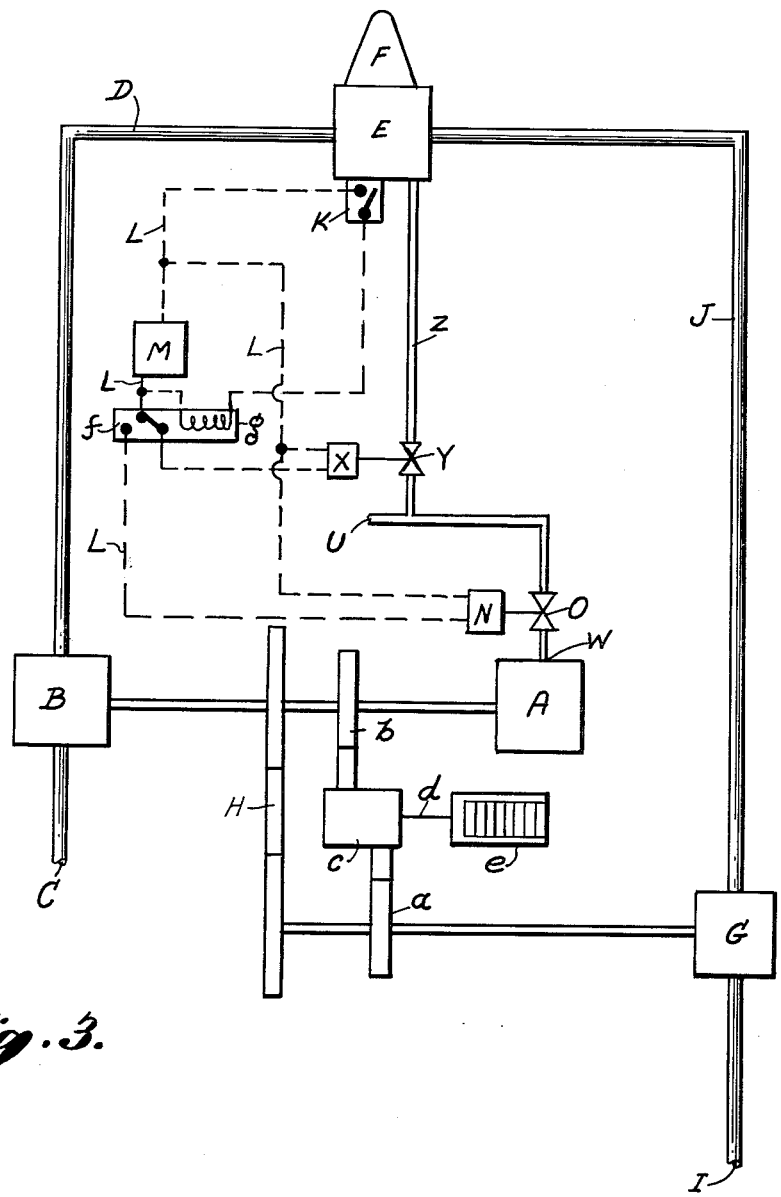

In the drawings:
FIGURE 1 is a diagrammatic view of a dual feed spray gun system according to this invention;
FIGURE 2 is a diagrammatic view similar to FIGURE 1 showing a revolutionary counter control;
FIGURE 3 is a view similar to FIGURE 1 including an automatic air flushing control; and,
FIGURE 4 is likewise a view similar to FIGURE 1 showing a uniselector control means.

In FIGURE 1 A is an air motor driving directly a pump B having inlet C and flexible feed pipe D to a spray gun mixing head E with spraying or dispensing nozzle F. The air motor A also drives a pump G through a constant ratio drive H. Pump G has an inlet I and flexible feed pipe J to the spray gun E. An electrical switch K is mounted on the spray gun E so as to be actuated by a small depression of the spray gun trigger and is connected electrically by conductors L to a source of electrical energy M and to a solenoid (optionally operated through an electrical relay) N controlling an air valve O. A similar switch P is mounted on the spray gun E so as to be actuated by a large depression of the spray gun trigger and is connected by conductors Q to a source of electrical energy R and to a solenoid (optionally operated through an electrical relay) S controlling an air valve T. An air inlet U leads to valve T and through a needle valve V to valve O. From valves T and O air is fed to the inlet W of the air motor A.

When the apparatus is used for spraying, for example polyurethane foam, a supply of polyester containing the usual other ingredients such as water, catalyst, flameproofing agent and the like, is connected to inlet C and a supply of polyisocyanate is connected to inlet I. A supply of compressed air is connected to inlet U. When the spray gun trigger is partially depressed, switch K is actuated and in turn solenoid N is actuated and valve O opens. Depending upon the setting of needle valve V a supply of air is passed to the motor A and the two spraying ingredients are pumped to the spray gun in proportions determined by the pumping capacities of pumps B and G and by the ratio of the drive H. When the spray gun trigger is fully depressed, switch P also is actuated and in turn solenoid S is actuated and valve T opens. An additional supply of air is thereupon passed to the motor A so that an increased spraying rate is achieved.

Because of the positive action of the spray gun control of the drive for the two pumps, it is not necessary for the spray gun itself to be provided with valves for the spraying ingredients, it is sufficient that the spray gun trigger should actuate the electrical switches in remote control of the air valves.

The use of an electrical control of the pump driving means in place of the pneumatic control of specification No. 759,602 affords further advantages in addition to those already described. Thus, failure of the pneumatic control leaves the pumps in operation with consequent risk of rupture of feed lines or of a safety bursting disc accompanied by spillage of spraying ingredients and tedious repair and replacement. Failure of the electrical control can only result in stopping the pumps or, possibly, in continued spraying; there can be no pressure build-up. The electrical system does not include any valve operating on a line carrying spraying ingredient and is free from any delicate adjustments.

Although the description of the invention is particularly directed to one embodiment wherein the ingredients are fed to a spray gun, the invention can also be applied to the metering of ingredients to other forms of apparatus, for example to a dispensing head supplying a mixture of polyurethane foam forming ingredients for generation of the foam in situ in a cavity or the like. In this case, in addition to metering constant proportions of ingredients, it is necessary to provide for the delivery of predetermined total quantities of materials so as to fill completely the cavity or mould. This may be achieved by timing the operation of the dispensing head, using a predetermined setting of the operating trigger so that the metering pumps operate at a predetermined rate. In view of the possibility of fluctuation in the speed of the pump motor or of errors in timing, it is preferred to control the quantity of material delivered by reference to the number of revolutions of the pumps. This may be achieved, for example, by arranging for the pump to operate a revolution counter adapted to actuate an electrical relay after a specified number of revolutions. The electrical relay then stops the pump motor (for example, by breaking the electrical circuit composed of conductors L in FIGURE 1). A further similar quantity of material may be metered through the dispensing head by re-setting the revolution counter and its electrical relay, either directly by hand, or by appropriate remote electrical control from the dispensing head, and repeating the sequence of operations.

Reference is now made to FIGURES 2–4 which show additional features of the present invention, like letters referring to similar elements.

In FIGURE 2, the switch P and associated circuit components R and S and valve T have been omitted for clarity although in practice two or more switches, of course, may be utilized. A predetermining type of revolution counter $e$ containing a conventional built-in switch is electrically connected to the dispensing gun switch K via leads L. When the switching device is automatically operated by the revolution counter $e$, the solenoid N will cease to be energized, the valve O will then close, thereby stopping the prime mover A and the resultant flow of material to the gun E. Conveniently, the counter $e$ is driven through a drive shaft $d$ from a gear box $c$. The gear box $c$ receives input from driven shafts $a$ and $b$ which, in turn, are connected to the respective shafts for pumps B and G. As will be appreciated, the ratio of the shaft $a$ and $b$ is designed to allow for any differences in capacity of the pumps B and G. By means of an epicyclic gearing, for example, the output shaft $d$ is arranged to summarize continuously the revolution of the metering pumps B and G and drive the revolution counter $e$ which may be of mechanical or electrical construction, well known in the art. The arrangement of the gear box $c$ enables the revolution counter $e$ to be calibrated directly in volumetric units of total output from the gun, irrespective of the proportions selected by the choice of ratio for the drive H. When the switch K is operated, the unit will start and as long as the switch K is held in the "on" position, the counter $e$ will continue to run, and automatically stop when the preset quantity has been dispensed.

In FIGURE 3 there is represented a dispensing air flushing arrangement for the spray gun E, only one switch K being shown for convenience. This view shows a solenoid X operating a valve Y in the air line Z, joined to the spray gun E. The solenoid X is electrically connected to double throw relay contacts $f$ so that when the dispensing or spraying is stopped by breaking the switch K, the solenoid N is deenergized, thereby causing valve O to close and cut off air from the prime mover A. Simultaneously, the solenoid X is energized, causing valve Y to open and allow a stream of flushing air to flow through conduit Z to the gun E for the purpose of cleaning out the mixing chamber. A delay type relay can be positioned between relay $f$, $g$, and the solenoid X to allow time for the gun E to be withdrawn from the cavity before the flushing air purges the mixing chamber.

In FIGURE 4 a uniselector arrangement is shown for providing a predetermined output. A press-button switch $m$ on the dispensing gun E is electrically connected to actuate the solenoid in a rotating arm of the uniselector $h$. At each depression of the press button $m$, the arm is caused to move through a small angle so that the electrical contact at the end of the arm moves successively from one contact to the next in a series of electrical contacts arranged in a circle, of which the rotating arm is a radius. The circular arrangement of electrical contacts, a representative number of which are shown in FIGURE 4, are connected electrically by conductors L to a similar arrangement of contacts on a second uniselector $i$. The rotating arm of uniselector $i$ is driven by a mechanical drive or electrical impulse feeder $p$, so that its rotation is proportional to the speed of the metering unit pumps. If the press button on the dispensing gun is depressed $n$ times, the rotating arm on the first uniselector $h$ will move to the $n$th contact and on operation of the switch $n$ the pumps will continue to operate until the rotating arm of the uniselector $i$ has likewise moved to the $n$th contact, whereupon an electrical circuit is completed and relay $j$ is energized, causing its contacts to open and break the circuit to relay $k$. The relay $k$, in turn, breaks the circuit to solenoid N from electrical energy source $l$ so that the valve O closes and cuts off the air supply to prime mover A. This stops the metering unit pumps and the unit is ready for another fixed volume of foam output to be preset on uniselector $h$.

From the foregoing description of the various embodiments of this invention, it is evident that the objects of this invention, together with many practical advantages are successfully achieved. While preferred embodiments of our invention have been described, numerous further modifications may be made without departing from the scope of this invention.

Therefore, it is to be understood that all matters herein set forth or shown in the accompanying drawings are to be interpreted in an illustrative and not in a limiting sense.

What we claim is:
1. Metering apparatus for separately supplying proportioned quantities of liquid to a dispensing device comprising: a mixing and dispensing head having a mixing chamber therein; separate conduits connected to said head for supplying separate liquids thereto; pump connected to each of said conduits for moving the liquid to said head; means for driving said pumps at proportionate speeds; valve means for controlling said pump drive means; electrical switch means operatively connected to said valve means to control the latter and thereby actuate said pump drive means; and means for passing a current of air through said mixing chamber, an air valve controlling said current of air; and electric control means responsive to the stopping of said pumps and operatively connected to said air valve to open said valve and thereby flush said mixing chamber on stopping said pumps at the end of a mixing cycle.

2. Metering apparatus as set forth in claim 1 including means for stopping said pumps after metering a predetermined quantity of liquid to permit dispensing a predetermined quantity of liquid mixture to fill a container.

References Cited in the file of this patent
UNITED STATES PATENTS

| | | |
|---|---|---|
| 1,267,889 | Milne | May 28, 1918 |
| 1,964,028 | Boynton et al. | June 26, 1934 |
| 2,638,847 | McGowan | May 19, 1953 |
| 2,788,953 | Schneider | Apr. 16, 1957 |
| 2,858,049 | Young et al. | Oct. 28, 1958 |
| 2,946,488 | Kraft | July 26, 1960 |